(12) United States Patent
Reynolds et al.

(10) Patent No.: US 6,177,651 B1
(45) Date of Patent: Jan. 23, 2001

(54) METHOD AND APPARATUS FOR PRODUCING WELDING POWER

(75) Inventors: Jon O. Reynolds; Lin Zhang, both of Appleton, WI (US)

(73) Assignee: Illinois Tool Works Inc., Glenview, IL (US)

( * ) Notice: Under 35 U.S.C. 154(b), the term of this patent shall be extended for 0 days.

(21) Appl. No.: 09/096,436

(22) Filed: Jun. 11, 1998

(51) Int. Cl.[7] .................................................. B23K 9/10
(52) U.S. Cl. ................... 219/137 PS; 219/73; 219/130.1
(58) Field of Search ........................... 219/137 PS, 130.1, 219/130.21, 130.31, 130.32, 130.33, 73

(56) References Cited

U.S. PATENT DOCUMENTS

| | | | |
|---|---|---|---|
| 2,583,507 | * | 1/1952 | Carpenter .................... 219/137 PS |
| 2,655,586 | * | 10/1953 | Schreiner et al. ................ 219/73 |
| 2,673,915 | * | 3/1954 | Steinert et al. ................ 219/130.1 |
| 3,558,845 | | 1/1971 | Norcross . |
| 3,684,855 | | 8/1972 | Wepfer . |
| 4,038,515 | | 7/1977 | Risberg . |
| 4,166,941 | | 9/1979 | Shelby Cecil . |
| 4,322,602 | | 3/1982 | Grist . |
| 4,435,632 | | 3/1984 | Risberg . |
| 4,508,954 | | 4/1985 | Kroll . |
| 4,521,664 | | 6/1985 | Miller . |
| 5,093,611 | | 3/1992 | Nakamura et al. . |
| 5,220,151 | * | 6/1993 | Terayama et al. ............. 219/130.32 |
| 5,315,089 | | 5/1994 | Hughes et al. . |
| 5,340,963 | | 8/1994 | Bodewigs . |
| 5,343,016 | | 8/1994 | Davis et al. . |
| 5,406,052 | | 4/1995 | Mizuno et al. . |
| 5,416,299 | | 5/1995 | Tabata et al. . |
| 5,473,139 | | 12/1995 | Matsui et al. . |
| 5,525,778 | | 6/1996 | Matsui et al. . |

FOREIGN PATENT DOCUMENTS

| | | | | |
|---|---|---|---|---|
| 2656980 | * | 6/1978 | (DE) | ................................ 219/130.1 |
| 2039167 | * | 7/1980 | (GB) | ................................ 219/130.1 |
| 2039168 | * | 7/1980 | (GB) | ................................ 219/130.1 |

* cited by examiner

*Primary Examiner*—Clifford C. Shaw
(74) *Attorney, Agent, or Firm*—George R. Corrigan

(57) ABSTRACT

A method or apparatus for sub arc/tubular wire arc welding includes providing a first wire to a first welding arc and a first ac power signal to the first welding arc. The first ac power signal is a substantially constant voltage signal. A second wire may be provided to a second welding arc near the first welding arc, and a second ac power signal is then provided to the second arc. A phase relationship between the first and second ac power signals is selected from a plurality of at least three possible phase relationships. Preferably, the frequency and/or balance of at least one of the signals is selectable. Also, the output frequency is preferably controllable such that it can be more or less than the input frequency.

28 Claims, 8 Drawing Sheets

AC MODE

DC MODE

METHOD AND APPARATUS FOR PRODUCING WELDING POWER

FIELD OF THE INVENTION

The present invention relates generally to the art of power supplies for electric arc welding and, more particularly, to power supplies for electric arc welding that are particularly well adapted for submerged arc welding and tubular wire welding.

BACKGROUND OF THE INVENTION

Submerged arc welding (also called SAW or sub arc) is a type of arc welding where the arc is not visible. Sub arc welding produces coalescence of metals by heating them with an arc between a bare metal electrode and the work piece. The arc and molten metal are submerged in a blanket of granular fusible flux on the work piece. Filler metal is provided by the electrode (or from a supplemental source such as a welding rod or metal granules). The arc is covered by the flux.

Tubular wire welding is a process in which the filler metal or flux is provided within the hollow portion of a tubular wire. Generally, tubular wire welding includes flux cored wire welding and metal cored wire welding. Both sub arc and tubular wire arc welding often are performed at relatively high output currents, such as up to 500 amps or more. Sub arc and tubular wire are welding both generally have a wire fed into an arc with an additional flux or filler metal provided. As used herein, sub arc/tubular wire welding refers to sub arc welding or tubular wire welding.

Many sub arc and tubular wire applications are automatic welding applications where either the work piece is moved under the weld head or the weld head is moved over the stationary work piece. Such automatic systems include wire feeders and are well known in the art. Wire feeders used in sub arc welding may be either constant speed or variable speed. Constant speed wire feeders are typically used with CV power supplies, and variable speed wire feeders may be used with CC power supplies. Each type of wire feeder has advantages and disadvantages. Preferably, a welding power supply should be useable with a constant speed wire feeder, or useable with either type of wire feeder.

Early automatic sub arc welding applications provided a DC output and used power sources with drooping V-A characteristics and voltage following wire electrode feeders. Subsequently, constant voltage (CV) DC sources were introduced to the process and linked to constant speed wire electrode feeders. However, magnetic fields generated by the DC arc current and surrounding the arc and the field associated with the ground currents react with each other in an unpredictable manner, causing the arc to move as if the arc were being "blown" to one side. This is referred to as arc blow. This effect is most objectionable in deep grove welds where erratic movement of the arc disturbs proper formation and placement of the weld puddle. Arc blow becomes a more severe problem as the amperage increases, because magnetic fields correspondingly increase.

Arc blow is less of a problem when using an AC power supply (because there is not a DC arc current). However, a sinusoidal output does not always perform well in sub arc welding processes because the sinusoidal wave exhibits a slow zero crossover which may result in arc rectification.

Square wave welding power sources attempt to use the advantages of sinusoidal AC welding, but with a rapid zero crossing to avoid arc rectification. One known square wave welding power supply is described in U.S. Pat. No. 4,038,515 issued to Risberg. This power supply provides for a square wave AC welding output. The Risberg design provides a constant current (CC) output and thus cannot be used with a constant speed wire feeder. The output of this power supply is at a frequency equal to the input frequency.

Another prior art sub arc welding power supply is described in U.S. Pat. No. 4,322,602 which was issued to Grist, and was owned by the assignee of the present invention. Grist describes an AC constant potential (CV) power source which may be used for sub arc welding. The output of Grist is an AC/CV output having a frequency equal to the input frequency, and having a fast zero crossing. This power supply is used with a constant speed wire feeder.

A TIG (Tungsten inert gas) welding power supply is described in U.S. Pat. No. 5,340,963, which is also owned by the assignee of the present invention, and is hereby incorporated by reference. U.S. Pat. No. 5,340,963 shows an AC power source for welding which receives a three phase input and provides a single phase AC output, having relatively fast zero crossings, at a frequency 1.5 times the input frequency. This is a type of step-up cycloconverter. However, this prior art does not teach a CV mode of operation, nor a CC controller. This prior art can be operated in a DC mode, but only operates on half of the sinusoidal input (thus, the SCRs and secondary windings must be able to handle twice the current, relative to the current capacity needed if the entire input were used). This can be costly and add weight and size to the machine.

A "step-up cycloconverter", as used herein, is a cycloconverter having an output frequency greater than the input frequency. It receives an AC input at a given frequency and provides an AC output at a higher frequency. This conversion is obtained by phase control or without using switches that are forced off, such as force commutated SCRS, IGBTs or FETs. Thus, a rectifier followed by an inverter or buck/boost converter is not a cycloconverter. The applicants have learned that sub arc welding performed at a frequency greater or less than the input line frequency (50 or 60 Hz) will provide a better weld. Power sources that provide an output at greater that than 60 Hz are known and are generally inverters or other converters. However inverter based converters require the use of expensive switches that may be turned off, such as IGBT's. This is particularly true in applications such as sub arc welding where the current desired may exceed 1000 amps. Accordingly, inverter based power supplies for use in sub arc welding may be expensive and not practical.

Additionally, it is desirable to provide flexibility in a welding power supply so that it may be used for a variety of applications. For example, it is desirable to provide a welding power supply that provides an AC or DC output. Also, it is desirable to provide a welding power supply that provides either a CV or a constant current (CC) output, that may be used with a constant or variable speed wire feeder. Further, a CV type power supply is easier for the user to set up (select operating conditions and parameters). Inverter based welding power supplies may be AC/DC and CC/CV, but as described above, they may be expensive, and not appropriate for sub arc applications.

Accordingly, it is desirable to provide a welding power supply that is suitable for sub arc welding that maybe operated either a CC, or a CV mode. Also, such a power supply will preferably be operable to provide an output having a frequency different than the input line frequency, when in the AC mode, but not require the use of IGBTs or other switches that must be turned off.

One type of sub arc/tubular wire welding involves the use of two arcs, and two wires, wherein the second arc and second wire follow closely behind the first arc and first wire (less than one inch, or close enough for the magnetic interaction to be meaningful, e.g.). This type of welding is typically done for high deposition or high speed applications.

It is generally desirable to be able to control the phase relationship (or provide phase staggering) between the power signals provided to the two arcs, because the phase relationship affects the magnetic interaction between nearby arcs. Prior art three phase power supplies could provide in-phase relationships, and 120 degree out of phase relationships using a scott-T connection. However, this provides for selection between only two different phase relationships, and requires changing the type of input connection. (As used herein, the number of phase relationships includes only phase shifts from 0 to 180 degrees, and does not include reversing the order. For example, if wire 1 is 120 degrees ahead of wire 2, that is not considered a different phase relationship from wire 2 being 120 degrees ahead of wire 1). The prior art phase staggering is not necessarily helpful because, depending upon the application and particular welding conditions, it may be desirable to have the phase relationship be close to in phase, close to out of phase, or somewhere therebetween. (As used herein, two power supplies have a variable or selectable phase relationship when the phase between the two outputs may be selected to be one out at least three discrete phase relationships between zero and 180 degrees, or any phase within a range of phases.) Thus, it is desirable for a power supply to be able to control the phase relationship so that the phase may be adapted for the particular application and welding conditions. Preferably, such phase control should be provided by a power supply that does not need to be an invertor type power supply, and more preferably, by a phase control power supply to avoid unnecessary cost and power limitations.

It is also generally desirable to be able to control the frequency at which sub arc/tubular wire arc welding is performed, because frequency affects penetration and/or other weld characteristics. The optimal frequency for a particular welding application and welding conditions may vary. Specifically, the particular desired frequency is often either greater or less than the 50 to 60 Hz typically provided by utility power supplies. Generally, invertor-based power supplies may be operated at a wide variety of frequencies. However, invertor based power supplies are expensive and difficult to design to operate at the high current magnitudes typically needed for sub arc/tubular wire welding. Accordingly, a sub arc/tubular wire welding power supply that has a variable frequency, but is not invertor based, is desirable. (As used herein, a power supply is a variable frequency power supply, or has a controllable frequency, when it is capable of providing an output having a frequency selectable from a plurality of discrete frequencies, or from any frequency within a range of frequencies). Preferably, such a welding power supply will be an scr based and/or phase controlled power supply.

Another parameter that is desirable to control for sub arc/tubular wire welding is the balance, because balance affects deposition rate, penetration and other weld characteristics. Balance, as used herein, refers to the percentage of time and/or magnitude of the positive portion of the waveform, relative to the negative portion of waveform. Some welding processes are better performed with a balance other than 50 percent. Invertor based power supplies provide balance control, however due to their expense and unsuitability for high current magnitude welding, they are not particularly useful for sub arc/tubular wire welding. Accordingly, a welding power supply that provides balance control using an SCR based power circuit, and/or phase control, is desired.

Thus, a sub arc/tubular wire arc welding power supply that provides one or more of a selectable frequency output, a selectable balance output, a CV ac output, and that is capable of being used with a second power supply having outputs that are phase staggered is desired.

SUMMARY OF THE PRESENT INVENTION

According to a first aspect of the invention, a method or apparatus for sub arc/tubular wire arc welding includes providing a first wire to a first welding arc and a second wire to a second welding arc. The second welding arc is disposed near the first welding arc. A first ac power signal is provided to the first arc, and a second ac power signal is provided to the second arc. A phase relationship between the first and second ac power signals is selected from a plurality of at least three possible phase relationships.

Various alternative embodiments include controlling the balance and/or frequency of at least one of the ac signals.

A second aspect of the invention is a method of sub arc/tubular wire arc welding including the steps of providing, or an apparatus that provides, a first wire to a first welding arc and a first ac power signal derived from a three phase input to the first welding arc. The first ac power signal is a substantially constant voltage signal.

An alternative embodiment includes providing a second wire to a second welding arc near the first welding arc, and providing a second ac power signal to the second arc. A phase relationship between the first and second ac power signals is selected from a plurality of at least three possible phase relationships. Other alternatives include selecting the frequency and/or balance of at least one of the signals.

A third aspect of the invention is a method or apparatus for sub arc/tubular wire arc welding that includes providing a first wire to a first welding arc and a first ac power signal to the first welding arc. A second wire is provided to a second welding arc near the first arc, and a second ac power signal is provided to the second arc. A phase relationship between the first and second ac power signals is selected from a plurality of at least three possible phase relationships. The frequency of one of the signals is variable.

Various alternatives include providing at least one of the signals at a substantially constant voltage, or selecting the balance thereof.

Another aspect of the invention is a method or apparatus for sub arc welding including providing a first wire to a first welding arc and providing a first ac power signal to the first welding arc. The first ac power signal has a controllable or variable frequency and an appropriate frequency is selected.

Yet another aspect of the invention is a method or apparatus for sub arc/tubular wire arc welding including providing a first wire to a first welding arc and providing a first ac power signal to the first welding arc. The ac signal is derived from a power line input having an input frequency, and the ac power signal has a controllable frequency, including at least one frequency below the input frequency.

Other principal features and advantages of the invention will become apparent to those skilled in the art upon review of the following drawings, the detailed description and the appended claims.

Figure 1:
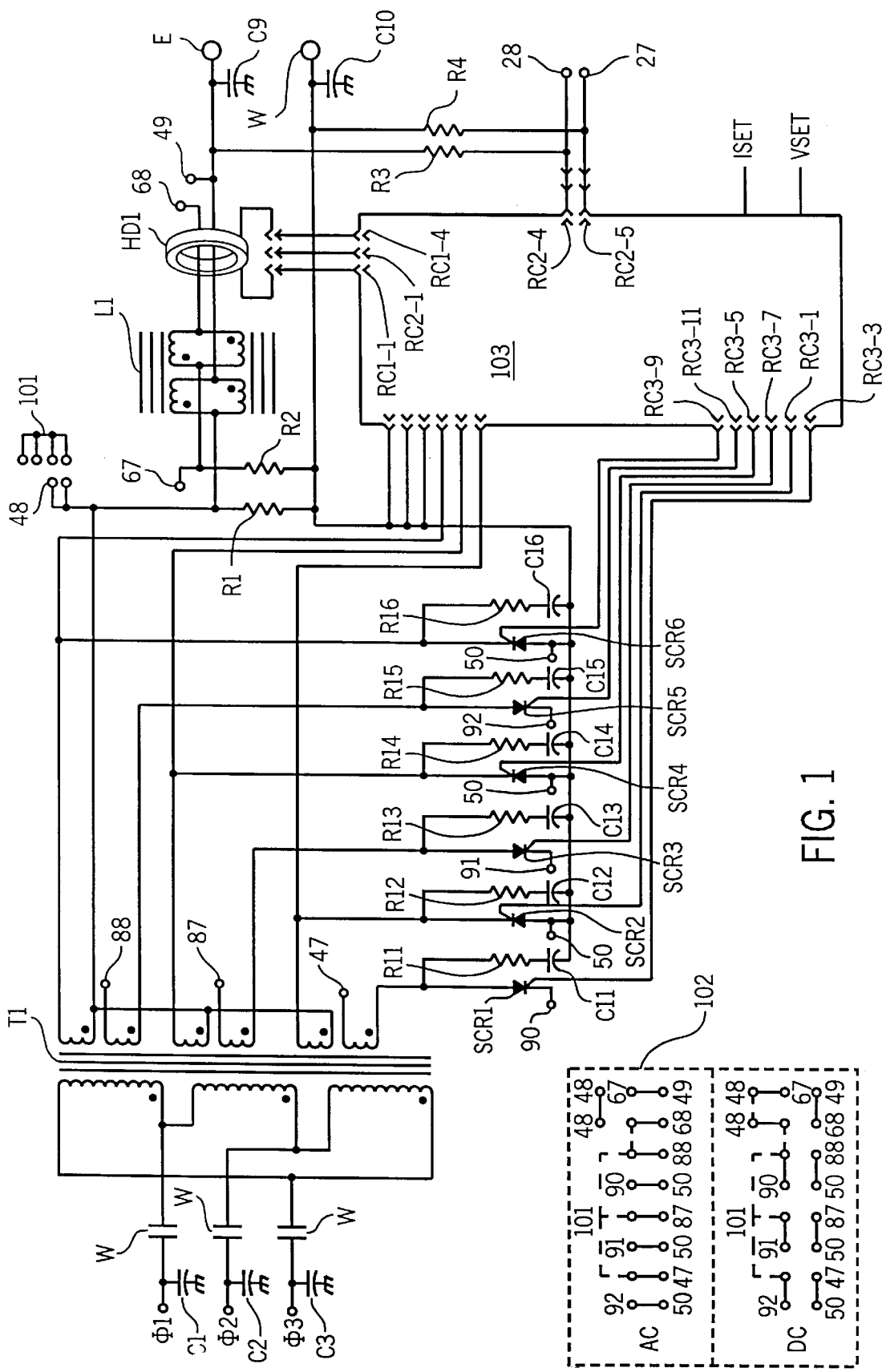
FIG. 1 is a circuit diagram of the power supply of the preferred embodiment, with jumpers showing the connections for either an AC or DC mode.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular power circuit and controller, it should be understood at the outset that the invention may include the addition of other components, removal of components, or the substitution for components. The preferred example, including component values, is not limiting, rather it as exemplary. One skilled in the art should be able to use other components and component values to implement this invention.

A circuit diagram of a AC/DC CC/CV welding power supply configured in accordance with the present invention is shown in FIG. 1. This welding power supply is a submerged arc welding power supply and should be capable of operating in a CV mode. A three phase sinusoidal input is received on a plurality of inputs Φ1, Φ2, and Φ3. A plurality of capacitors C1, C2, and C3 are provided between the inputs and ground to act as high frequency filters. A contactor having a plurality of contacts W is used to connect the input power to a transformer T1.

The primary transformer T1 is connected in a delta connection, although a wye connection could be used. A delta connection is used in the preferred embodiment because it is designed using wires with a lesser current carrying capacity, but with greater number of turns.

The secondaries of transformer T1 are split, center tapped secondaries. "Split, center tapped secondary," as used herein, is a center-tapped secondary, wherein other circuitry (SCRs e.g.) may be disposed between each set of windings and the center tap. The turns ratio in the preferred embodiment is about 6.9:1 so that 460 volts on Φ1, Φ2, and Φ3 produces about 70 volts open circuit.

The power supply of FIG. 1 may be used to provide either an AC or DC (AC/DC) output. The user selects between an AC and DC output by appropriately connecting a plurality of jumpers. A box 102 shows the position of the jumpers for the AC and DC modes of operation.

A plurality of SCR's, SCR1–SCR6, are connected to the secondary windings. Each SCR is provided with a capacitor (C11–C16) and a resistor (R11–R16) to act as a snubber. The configuration of SCRs 1–6 depends upon the mode (AC or DC) of operation. A controller 103 provides the gating signals to SCR's 1–6 so that they conduct in a manner such as that described in the AC mode of U.S. Pat. No. 5,340,963.

Figure 2:
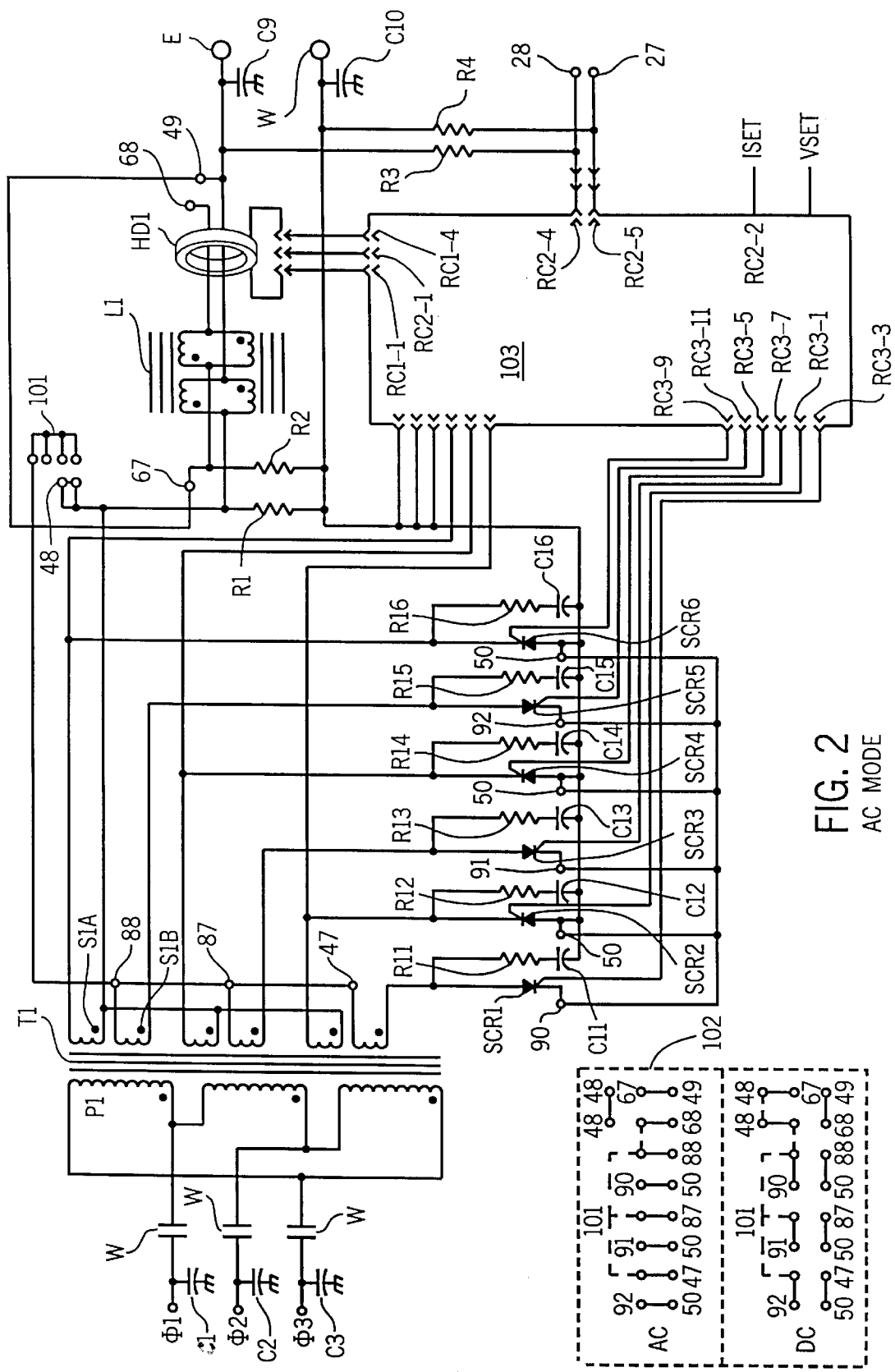
FIG. 2 is a circuit diagram of the power supply of the preferred embodiment configured in the AC mode.

An inductor L1 (400 microhenry each winding), which is a center tap inductor, helps provide a smooth output and assists in rapid zero crossing when the power supply is operated in the AC mode. L1 is configured so that current will flow through the inductor in the same flux creating direction regardless of the direction of current in the primary (and associated secondary) winding. Each leg of inductor L1 is comprised of two magnetically parallel windings made of aluminum and mounted on opposite legs of a U core to help carry the high current load in the preferred embodiment. Inductor L1 will be connected in one of two ways (as shown in FIGS. 2 and 3), depending upon the mode of operation selected (AC or DC).

A pair of resistors R1 and R2 (20 ohms) are provided to help SCRs 1–6 latch ON under no load condition. A hall device HD1 is provided to sense the current output and provide it to controller 103 on an input RC2-1. Inputs RC1-1 and RC1-4 provide power to hall device HD1.

A pair of capacitors C9 and C10 are provided to an output electrode E and a workpiece W. Capacitors C9 and C10 have a capacitance of 0.1 $\mu F$ and are provided to act as high frequency filters.

A pair of resistors R3 and R4 (200 ohms) are used to sense the output voltage provided to electrode E and work W, and are provided to controller 103 on inputs RC2-4 and RC2-5. Controller 103 includes a current regulator for operation in the constant current mode which uses the current feedback from hall device HD1. In the preferred embodiment (described in more detail below with reference to FIG. 4), a typical analog PI current regulator is provided. Controller 103 also includes a voltage regulator for operation in the CV mode which uses the voltage feedback from resistors R3 and R4, or from a remote sensor connected to nodes 27 and 28. In the preferred embodiment (described in more detail below with reference to FIG. 5), a typical analog PI voltage regulator is provided.

The output of the power circuit may be controlled by controlling the phase angle at which the SCR's are fired. To increase the output of the power circuit the SCR's are phased forward so that they fire earlier in each cycle. Conversely, to decrease the output, the SCR's are phased back so that they fire later. The nominal conduction time for each SCR is 120 degrees (of the input cycle) so that the output frequency is 1.5 times the input frequency.

Controller 103 receives an input command ISET indicative of a user selected output current. ISET is obtained from a front panel potentiometer (or a remote or other input device) of the welding power supply when it is operated in the CC mode. Controller 103 compares ISET to the sensed current and controls the firing angle of SCRs 1–6 accordingly. A variable speed wire feeder is used in the CC mode in the preferred embodiment.

Controller 103 also includes an input VSET indicative of a user selected output voltage for operation in the CV mode. VSET allows the user to select a Constance voltage output. The PI voltage regulator of controller 103 has an output dependent upon the difference between VSET and the output voltage received via resistors R3 and R4. The output of the voltage regulator is provided as the set point input, ISET, (instead of the user selected output current) to the current regulator. The current and voltage regulators are thus cascaded such that a CV output is obtained. A constant speed wire feeder is used in the CV mode in the preferred embodiment.

The power supply of FIG. 1, having the jumpers connected in the AC mode, is shown in FIG. 2. A plurality of terminals 47, 87 and 88, are connected to the undotted end of one leg of each secondary on transformer T1. These legs of each secondary are connected to, on the dotted end, SCRs 1, 3 and 5. SCRs 1, 3 and 5 are configured to allow current flow (when on) from the dotted end of the secondary to the SCR. SCRs 1, 3 and 5 are also each connected to a terminal 50 (through a plurality of terminals 90, 91 and 92). Terminal 50 is also connected to workpiece W. The undotted end of these secondaries is connected to an end of inductor L1. The center tap of inductor L1 is connected to the electrode.

The other halves of the secondaries have their dotted ends connected together and also connected to the other end of inductor L1. The undotted ends of these secondaries are connected to SCRs 2,4 and 6, which allow current to flow into the undotted ends of the secondaries (when on). SCRs 2, 4 and 6 are also connected to the workpiece.

The current paths will now be described with respect to secondaries S1A and S1B, which are associated with primary P1. When SCR6 is on, current flows through SCR6 to the undotted end of secondary S1A, then from the dotted end of secondary S1A through inductor L1 to electrode E, through the arc to workpiece W, and back to SCR6. Similar current paths exist with SCRs 2 and 4. When SCR5 is on, current flows from the dotted end of secondary SIB through SCR5, to workpiece W, through the arc to electrode E, through L1, and back to the undotted side of the secondary. Similar current paths exist with SCRs 1 and 3.

Figure 2A:
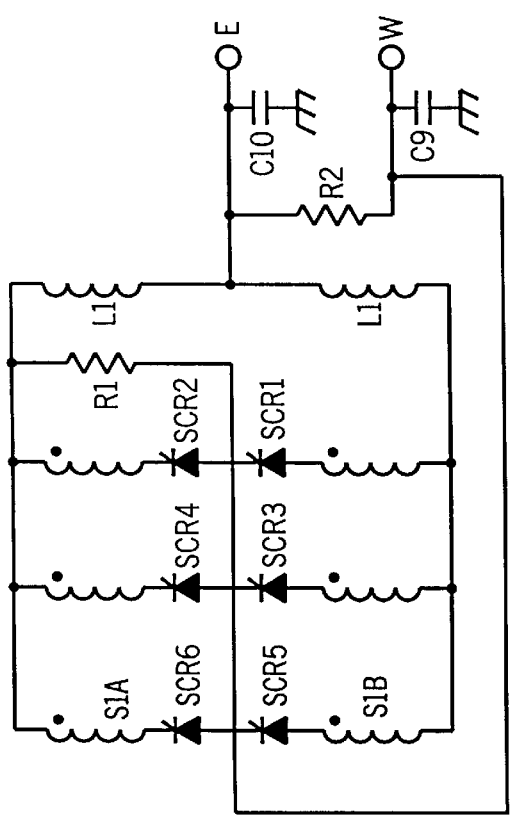
FIG. 2A is a circuit diagram of the power supply of the preferred embodiment configured in the AC mode, wherein most of the non-power components are not shown.

FIG. 2A is a simplified circuit diagram showing the power supply of FIGS. 1 and 2 connected in the AC mode. However, FIG. 2A primarily shows the secondary side power components on the configured in the AC mode, and omits snubbers etc., and the jumpers relating to the DC mode.

FIG. 2A shows that, in the AC mode, the power circuit of the present invention, is configured much like the power circuit of U.S. Pat. No. 5,340,963. Specifically, when the SCR's are fired in a sequence of SCR6, SCR3, SCR2 SCR5, SCR4, SCR1, and each SCR is conducts for at most 120 degrees before the zero crossing, an output signal having a frequency of 1.5 times the input line frequency is created. However, according to the present invention, the power circuit may be operated in a CC or CV mode. Thus, it may be seen that a step up cycloconverter is provided which operates in a CV or a CC mode.

Because the output is provided through center tap conductor L1 so that the current is always flowing in the same flux creating direction in L1, regardless of the direction of the output current flow, inductor L1 smooths the welding current and assists in a rapid zero crossing.

The power source as configured in a DC mode is shown in FIG. 3. SCR's 1,3, and 5 are connected to bus bar 101 while SCR's 2,4, and 6 are connected to the work piece in the DC mode. The SCR's are fired in the same sequence as that for the AC mode. However, in this configuration the output will be a DC output. Inductor L1 is used to provide a smoother welding output.

Current flows from the dotted side of secondary S1A through inductor L1, through the arc, through SCR6, and back to secondary S1A. Similar current paths exist through SCRs 2 and 4. Another current path is from the dotted end of secondary S1B, through SCR5, through inductor L1 (in the same flux-creating direction sa the other current path), through the arc and back to secondary S1B. Similar current paths exist through SCRs 1 and 3.

Figure 3A:
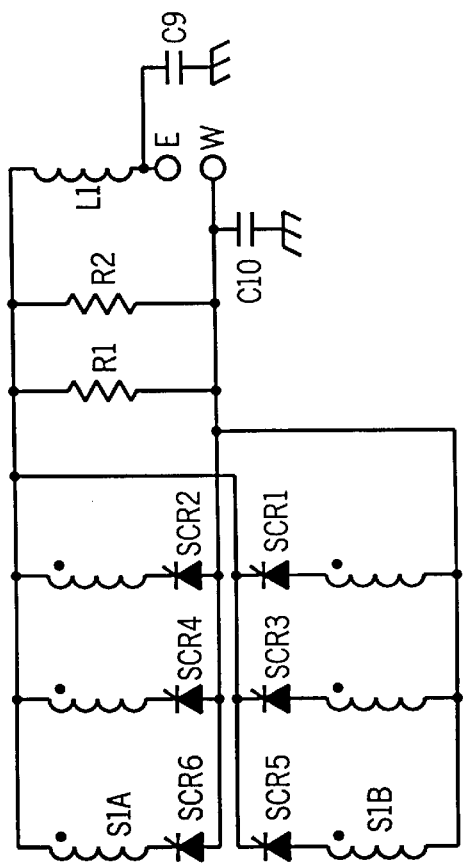
FIG. 3A is a circuit diagram of the power supply of the preferred embodiment configured in the DC mode, wherein most of the non-power components are not shown.
Figure 3:
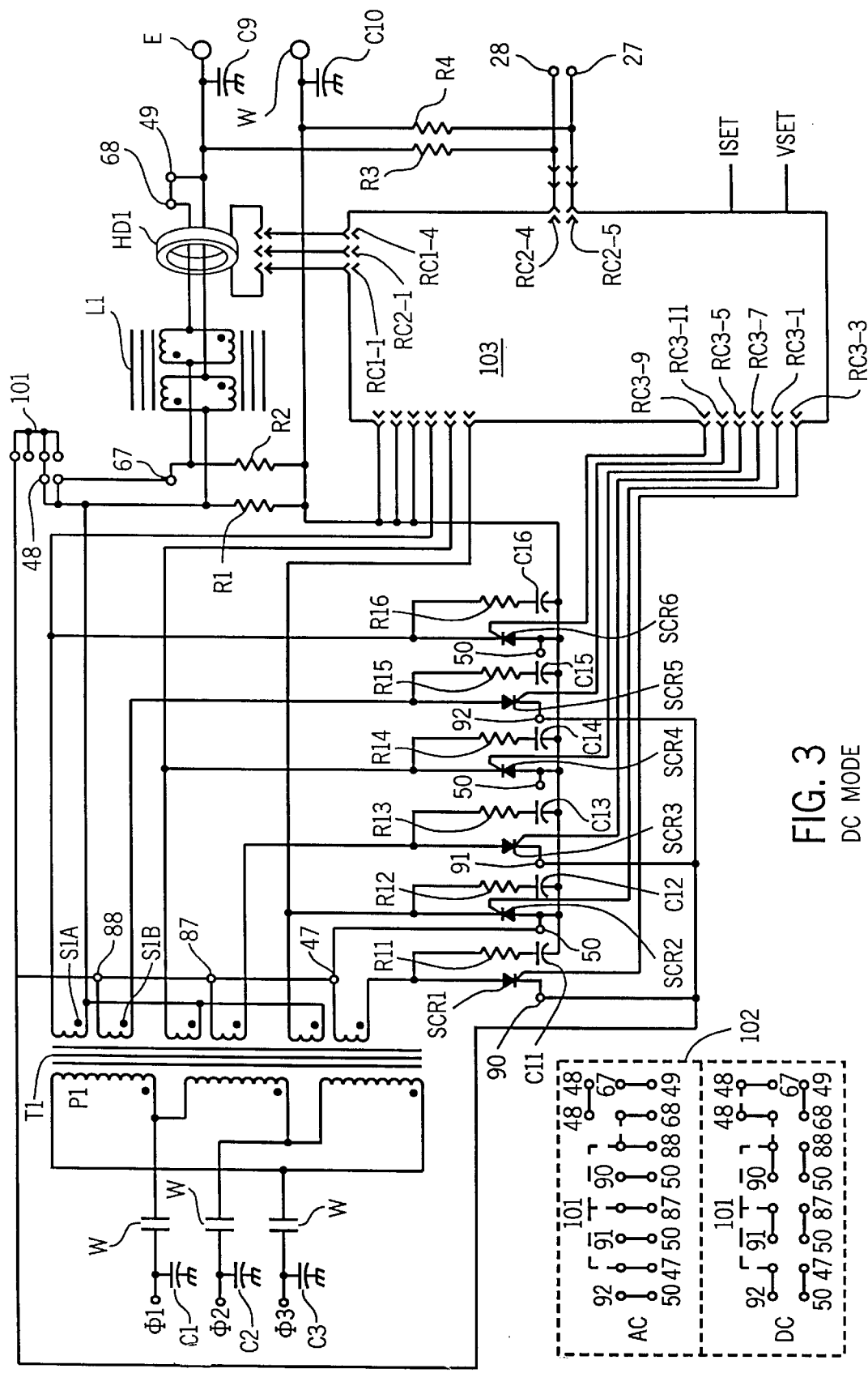
FIG. 3 is a circuit diagram of the power supply of the preferred embodiment configured in the DC mode.

FIG. 3A is a simplified schematic of the power circuit of FIGS. 1 and 3 where the primary windings and certain associated circuitry likes snubbers are not shown. Thus, a power circuit that operates in AC or DC mode, with a controller that can provide a CC or CV output has been described. The output is preferably used in sub arc welding.

Controller 103 allows the user to select between a CV mode and a CC mode of operation. Selection is preferably made using a toggle switch on the front panel of the power supply (or using a remote). Two regulators are provided: a current regulator and a voltage regulator. When CC operation is selected, the current regulator is used to control the output, and the voltage regulator is not used. When CV operation is selected, the output of the voltage regulator is used as the set point for the current regulator. The control is then based on the current regulator output. This cascading arrangement allows the user to select a CV output, and still use the current regulator to control the SCR firing.

Figure 4:
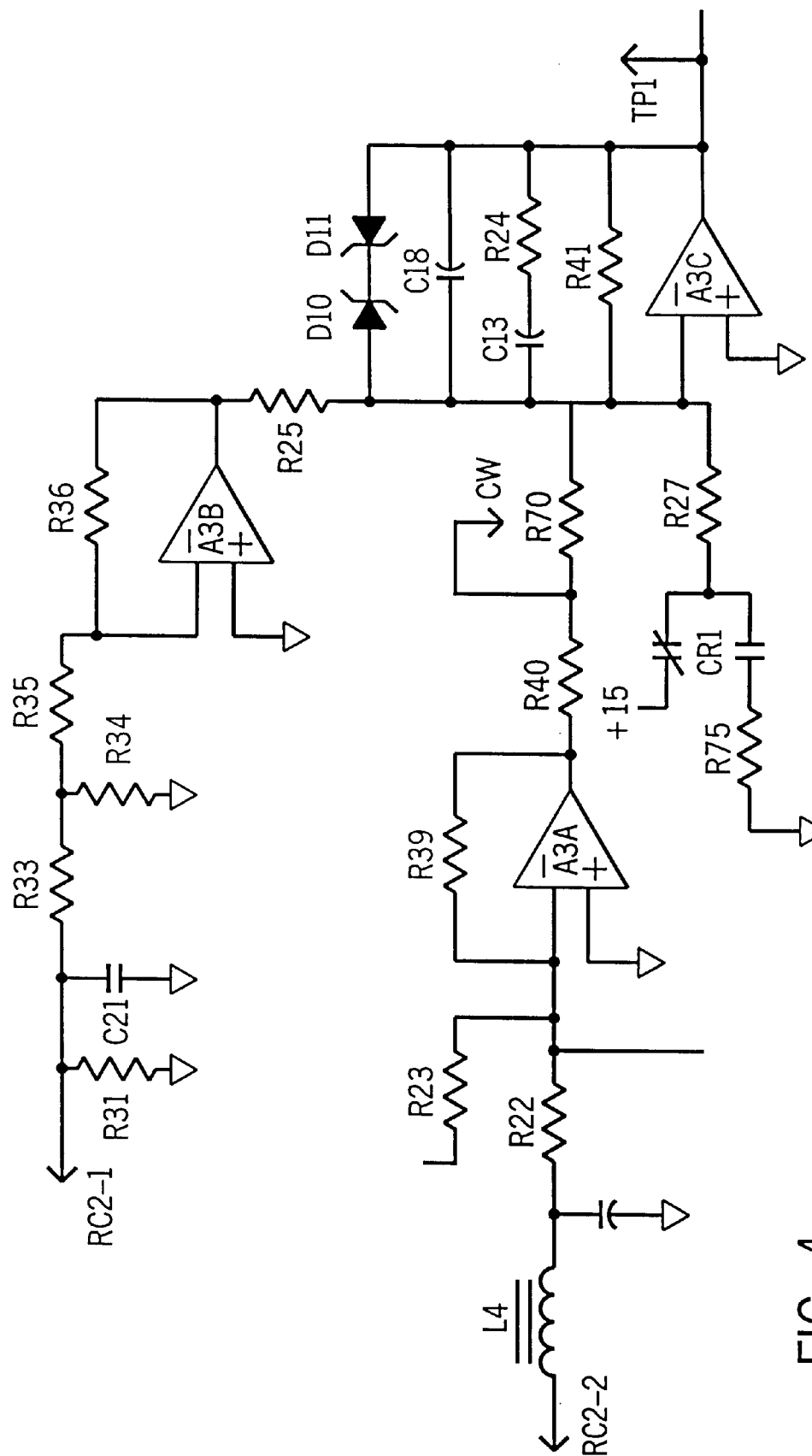
FIG. 4 is a circuit diagram of a current regulator used in the preferred embodiment.

The current regulator is a proportional integral (PI) current regulator, in the preferred embodiment, and is shown in FIG. 4. The current feedback signal is provided on RC2-1 from hall device HD1 (see FIG. 1). The current feedback signal is provided across a resistor R31 (5 ohms) and a capacitor C21 (0.1 $\mu$F) which filter the current feedback signal.

The filtered signal is provided to resistors R33 (475 ohms), R34 (511 ohms), R35 (10K ohms), R36 (200K ohms) and an op amp A3B. Op amp A3B scales the current feedback signal and provides it through a resistor R25 (39.2K ohms) to the integrating portion of the circuit.

The current reference signal (ISET) is provided on pin RC2-2. The current reference signal is, in the preferred embodiment, derived from a potentiometer on the front panel when the power supply is operated in the CC mode. The current reference input varies between 0 and 10 volts. The current reference input on pin RC2-2 is obtained from the output of the voltage regulator (described below) when the power supply is operated in the CV mode.

The current reference signal (ISET) is provided through an inductor L4 (1000 $\mu$henry) and a capacitor C22 (0.1 $\mu$F) which filter and smooth the ISET. The filtered ISET is then provided to a resistor R22 (100K ohms), a resistor R39 (121K ohms) and an op amp A3A. Op amp A3 scales the ISET. A Resistor R23 (825K ohms) sets the minimum machine output. A relay CR1 shuts down the regulator when the machine is turned off. In one embodiment CR1 is replaced with an op amp which performs the function of biasing the voltage regulator off when an appropriate input voltage is not applied to the contactor control circuit. This embodiment accepts either 115 VAC or 24 VAC as the input to the contactor control circuit.

The output of op amp A3A is provided through a resistor R40 (43.2K ohms) and a calibrating resistor R70 to the integrating portion of the PI regulator. The integrating portion of the regulator includes and op amp A3C, a resistor R41 (1M ohms), a capacitor C13 (0.33 µF), a resistor R24 (82.5K ohms), a capacitor C18 (560 pF), and zener diodes D10 and D11. The components are configured with op amp A3C such that the output of op amp A3C (an error signal) is a signal dependent upon the difference between the current reference and the current feedback signals, and the integral of that difference. The output is then used to trigger the SCR'S.

When the error indicates that not enough current is being provided, the SCR's are triggered earlier in their cycles, thus providing more power. When the error signal indicates that too much power is being provided, the SCR's are fired later in their respective cycles.

Figure 5:
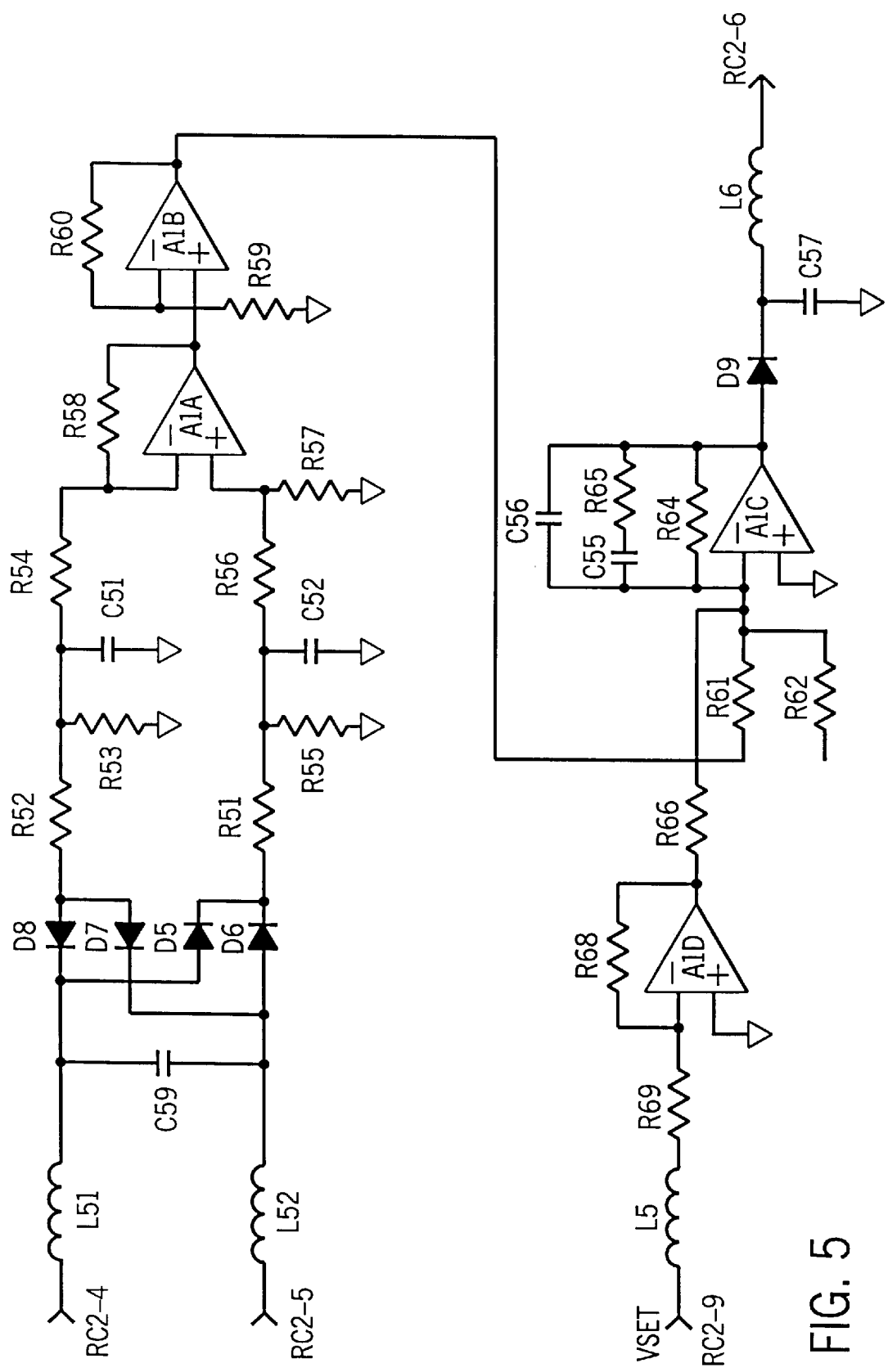
FIG. 5 is a circuit diagram of a voltage regulator used in the preferred embodiment.

The portion of controller 103 that provides the CV regulation in the preferred embodiment is shown in FIG. 5 and it is a PI regulator which receives as inputs on pins RC2-4 and RC2-5 the voltages on electrode E and work W (the output voltage). The output voltage feedback signals are provided through inductors L51 and L52 (1000 µhenry) and a capacitor C59 (0.01 µF) to smooth and filter the feedback signal. The smoothed and filtered feedback signal is rectified by a full bridge comprised of diodes D5–D8. The rectified feedback voltage signal is provided through a filter network comprised of resistors R52 (100K ohms), R53 (5.62K ohms), R51 (100K ohms), R55 (5.62K ohms) and capacitors C51 (0.22 µF) and C52 (0.22 µF).

The signal is then provided to op amp A1A having scaling resistors R54 (100K ohms), R56 (100K ohms), R58 (221K ohms) and R57 (221K ohms). Op amp A1A scales the signal and provides it to another op amp A1B having feedback resistors R59 (47.5K ohms) and R60 (4.32K ohms). The output of amp A1B is a scaled feedback signal and is provided through a resistor R61 (10K ohms) to the inverting input of an op amp A1C. In one embodiment the full bridge rectifier is omitted, and a precision rectifier (including an op amp), is inserted between op amps A1A and A1C.

A voltage reference command (VSET) is provided on pin RC2-9 and is preferably obtained from a potentiometer on the front panel of the power supply. Of course, other methods such as a remote or digital circuitry may be used to obtain the voltage reference signal. VSET is thus a signal indicative of the user's desired output voltage when operating in the CV mode.

VSET is provided through an inductor L5 (1000 µH), which smooths VSET to an op amp A1D, which has scaling resistors R69 (150K ohms) and R68 (100K ohms). The scaled VSET is provided through a resistor R66 (15K ohms) to op amp A1C.

Op amp A1C performs the proportional and integral functions. The circuitry associated with op amp A1C, including capacitor C56 (0.001 µF), capacitor C55 (0.22 µF) resistor R65 (35.7K ohms), and resistor R64 (332K ohms), are configured so as to provide the desired PI regulation. The output of op amp A1C is an error signal that is dependent on the difference, over time, between the voltage reference signal and the voltage feedback signal. Resistor R62 (61.9K ohms) sets minimum output voltage.

The error output of op amp A1C is provided through a diode D9, a capacitor C57 (0.1 µF) and an inductor L6 (1000 µhenry). This error output is provided on pin RC2-6. When the power supply is operated in the CV mode pin RC2-6 is connected to pin RC2-2, so that ISET is the voltage regulator output.

Numerous modifications may be made to the present invention which still fall within the intended scope hereof. For example, other control circuitry could be employed, including digital circuitry. A regulator other than a PI regulator could be used. The regulators could be selected in the alternative, rather than in a cascading arrangement. Other power circuits could be used as well.

Figure 6:
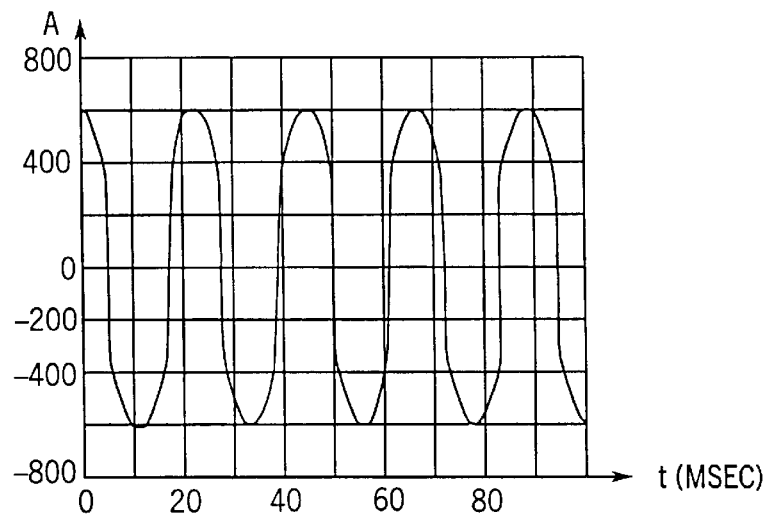
FIGS. 6–8 are waveforms showing various frequency outputs produced using the power supply of FIGS. 2 and 2A.

One advantage of the power supply described herein is that it may be used to provide a variable frequency output. A 90 Hz output (for a 60 Hz input) is obtained by firing the SCR's in the sequence of SCR1, SCR4, SCR5, SCR2, SCR3, SCR6, (+−+−+−) and then repeating sequence. An output obtain using this firing sequence is shown in FIG. 6. As may be seen, the frequency is 90 Hz, and the waveform generally includes a positive pulse followed by a negative pulse etc. However, other frequencies may be obtained. The frequency may be selected by the user, or automatically by the power supply based on welding parameters such as current, process, arc length, etc., in various alternatives.

Generally, the power supply provides a pulse of a positive polarity when one of SCRs 1,3 and 5 are triggered, and of a negative polarity with one of SCR's 2,4 and 6 are triggered. The firing sequence should be selected so that one SCR is fired on each phase, before any phase is repeated. Thus, SCRs 1 or 2 should be fired, then 3 or 4, then 5 or 6. However, there is no need to alternate between polarities. Thus, an output having a frequency of less than 90 Hz may be obtained by firing multiple positive pulses followed by multiple negative pulses.

Figure 7:
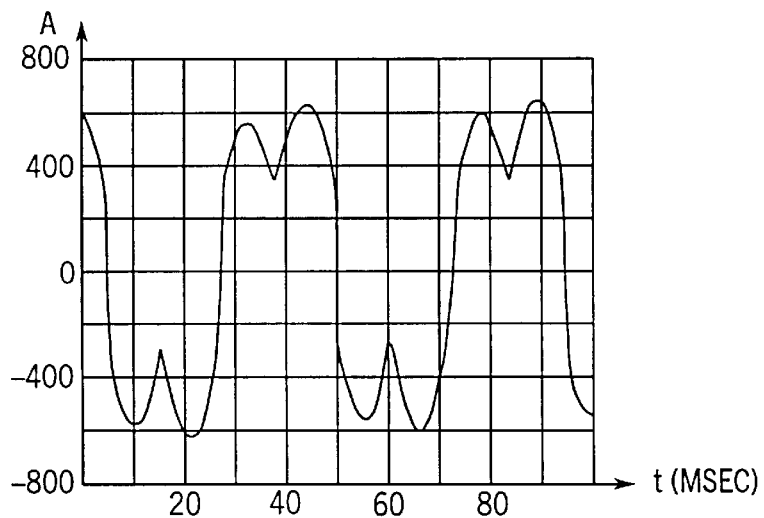

A 45 Hz output may be obtained, for example, with a firing sequence that provides two positive pulses, followed by two negative pulses, followed by two positive pulses etc. Such a firing sequence may be SCR1, SCR3, SCR6, SCR2, SCR5, SCR3, etc. (++−−++−− ... ). A waveform obtained using this firing sequence is shown in FIG. 7 and generally includes two negative pulses followed by two positive pulses, with the pattern repeating thereafter.

Figure 8:
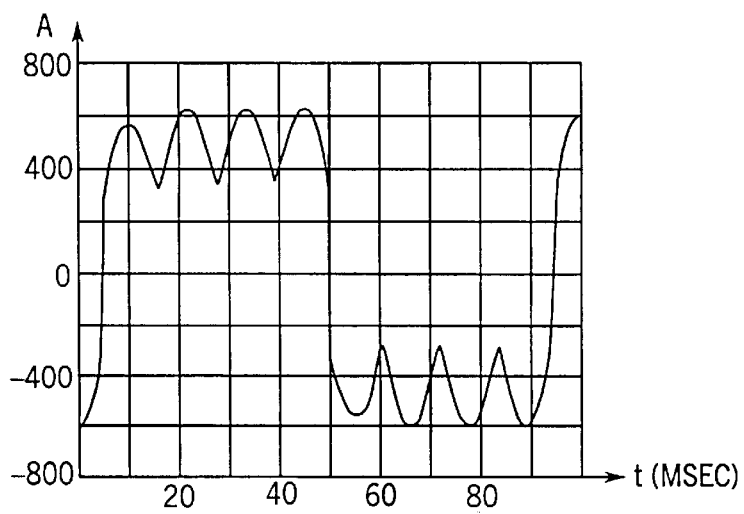

FIG. 8 shows an output having a frequency of 22.5 Hz. This output was obtained by firing 4 positive SCRs, followed by 4 negative SCRs and repeating that at pattern. For example the pattern could include SCR1, SCR3, SCR5, SCR1, SCR4, SCR6, SCR2, SCR4 (++++−−−−++++−−−− ... ).

Generally, any frequency F=90/n for a 60 Hz input (or 75/n for a 50 Hz input) may be obtained, where n is a positive integer, and the firing sequence is n positive pulses followed by n negative pulses.

Additionally, by selecting a proper firing sequence, the balance may be controlled or selected. For example, by selecting three positive pulses, followed by two negative pulses (+++−−+++−− ... ), a balance of 60 percent positive and 40 percent negative is provided. The balance may be selected by the user, or automatically by the power supply based on welding parameters such as current, process, arc length, etc., in various alternatives. The controller includes a steering flip-flop and a counter/divider to select the output frequency and symmetry in the preferred embodiment.

Two or more power sources of the type shown in FIGS. 2 and 2A can be used with one or more arcs on a common workpiece. If two power sources are used to provide a single arc, then the power sources must be synchronized, set for the same output frequency, and set for the same waveform balance. The power sources may be synchronized by interconnecting control circuits (using common clocks and resets for example) and matching the input connections to each machine. Matching the input connections to each machine may be accomplished by connecting input lines 1, 2, and 3 of FIG. 2 to the same contactors of each power source.

Figure 9:
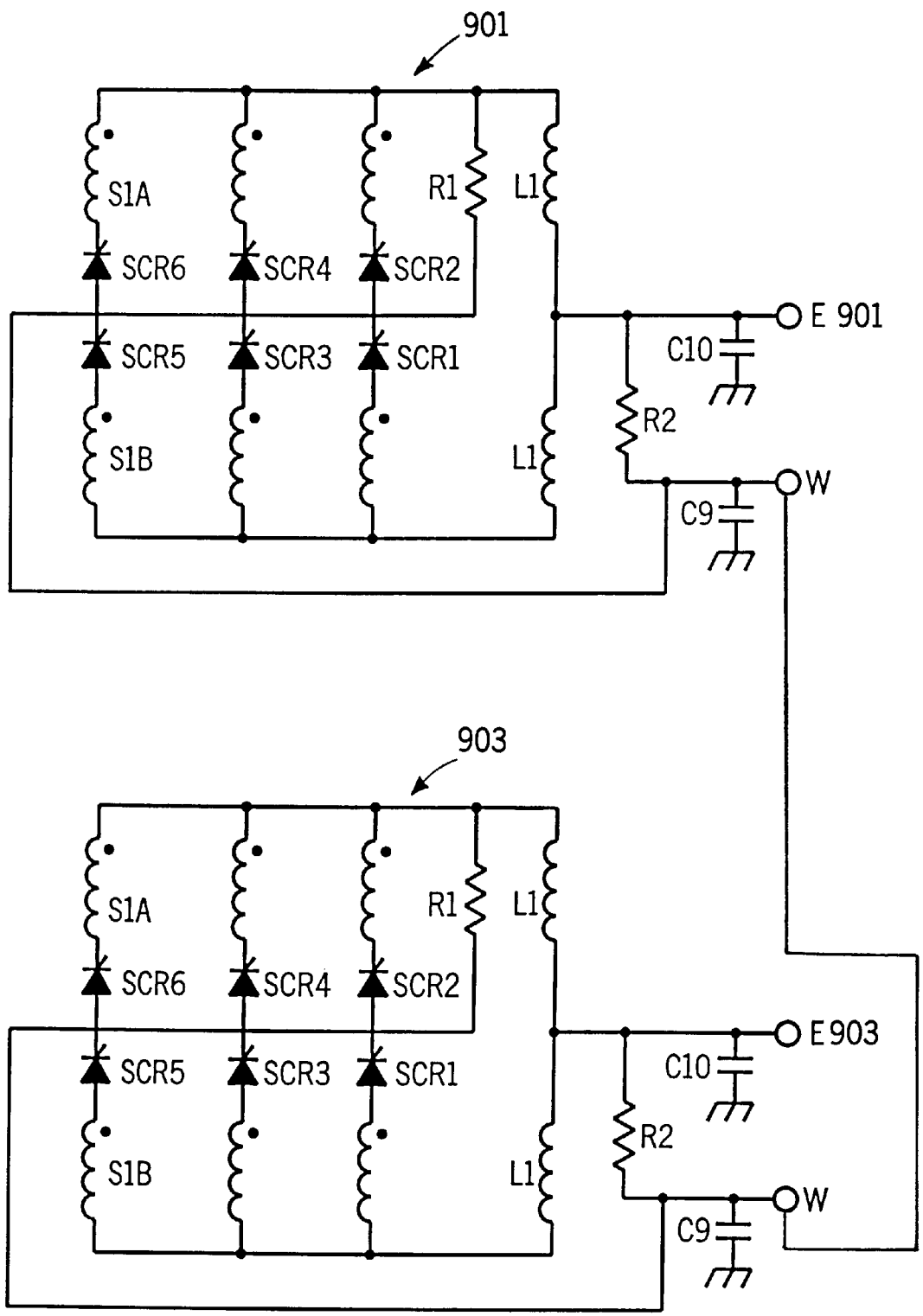
FIG. 9 is a circuit diagram of two welding power sources of the type shown in FIG. 2A connected to provide two arcs to a single workpiece.

If 2 power sources, 901 and 903 (FIG. 9), are to be used to provide 2 arcs on lines E901 and E903 to a common workpiece W, such as that often used in sub arc/tubular wire welding, then one power output may be phase shifted or staggered with respect to the other power output to help cancel magnetic interaction or to achieve a desired interaction to improve the weld quality. Using power sources such as that shown in FIGS. 2 and 2A, phase staggering may be readily achieved.

If a 90 Hz output is selected (for a 60 Hz input, or a 75 Hz out put for a 50 Hz input) the arcs may be in phase (zero degrees apart), shifted 90 degrees (2.77 milliseconds) or operated out of phase (shifted 180 degrees). In phase operation is obtained by matching the inputs to each machine as described above, and synchronizing the control circuits. 180 degrees phase staggered operation is obtained by connecting the inputs as described above (matching each line with the same contractor has on the other machine) but by reversing the electrode and work connections on one machine. A 90 degree phase shift may be obtained by connecting the reversing any two of the input lines 1, 2 and 3 on one machine. The control circuits are then synchronized, and a +−+−+− firing sequence such as that described above is used.

If a 45 Hz output is chosen, then phase staggering of 45, 90, 135, and 180 degrees may be obtained. To obtain these phase shifts any two inputs are reversed (as above) on one machine.

A firing sequence of SCR1, SCR3, SCR6, SCR2, SCR3, SCR5, SCR2, SCR4, SCR5, SCR1, SCR4, and SCR 6 for both machines will provide the 45 degree phase relationship (shift). A 90 phase shift, given a 45 Hz operation and the reversed inputs, may be obtained by firing one machine with a sequence of SCR1, SCR3, SCR6, SCR2, SCR3, SCR5, SCR2, SCR4, SCR5, SCR1, SCR4, SCR6. The other machine should be fired SCR6, SCR1, SCR3, SCR6, SCR2, SCR3, SCR5, SCR2, SCR4, SCR5, SCR1, SCR4. Other phase shifts may be obtained by using suitable firing sequences. Generally, firing sequence should be chosen such that the desired polarity output on each machine will be obtained.

For a given output frequency F (obtained as described above using 90/n or 75/n) any phase shift equal to any integer multiple of 90/n may be obtained. Thus, if n=3 (giving an output frequency of 30 Hz for a 60 Hz input or an output of 25 Hz for a 50 hz input) is chosen, a phase shift of 90/3=30, 60, 90, 120, 150, and 180 may be obtained (for both 60 and 50 Hz inputs).

Thus, it should be apparent that there has been provided in accordance with the present invention a method and apparatus for providing sub arc welding power that provides a CV output, with variable or controllable frequency, and variable or controllable balance, and variable or controllable phase staggering that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A method of sub arc/tubular wire arc welding comprising the steps of:

providing a first wire to a first welding arc;

providing a second wire to a second welding arc, the second welding arc being disposed near the first welding arc;

providing a first, switched, ac power signal to the first arc;

providing a second, switched, ac power signal to the second arc; and selecting a phase relationship between the first and second ac power signals from a plurality of at least three possible phase relationships.

2. The method of claim 1 wherein at least one of the first and second ac power signals has a controllable balance, and further comprising the step of selecting the balance.

3. The method of claim 1 wherein at least one of the first and second ac power signals has a controllable frequency, and further comprising the step of selecting the frequency.

4. A method of sub arc/tubular wire arc welding comprising the steps of:

providing a first wire to a first welding arc;

providing a first ac power signal derived from three phase power, to the first welding arc;

providing the first ac power signal at a substantially constant voltage output, by controlling the output voltage magnitude.

5. The method of claim 4 further comprising the steps of:

providing a second wire to a second welding arc, the second welding arc being disposed near the first welding arc;

providing a second ac power signal to the second arc; and selecting a phase relationship between the first and second ac power signals from a plurality of at least three possible phase relationships.

6. The method of claim 5 wherein at least one of the first and second ac power signals has a controllable frequency, and further comprising the step of selecting the frequency.

7. The method of claim 5 wherein at least one of the first and second ac power signals has a controllable balance, and further comprising the step of selecting the balance.

8. The method of claim 4 wherein the first ac power signal has a controllable frequency, and further comprising the step of selecting the frequency.

9. The method of claim 4 wherein the first ac power signal has a controllable balance, and further comprising the step of selecting the balance.

10. A method of sub arc/tubular wire arc welding comprising the steps of:

providing a first wire to a first welding arc;

providing a first switched ac power signal to the first welding arc;

providing a second wire to a second welding arc, the second welding arc being disposed near the first welding arc;

providing a second switched ac power signal to the second arc;

selecting a phase relationship between the first and second ac power signals from a plurality of at least three possible phase relationships;

wherein at least one of the first and second ac power signals has a controllable frequency; and selecting the frequency.

11. The method of claim 10 wherein at least one of the first and second ac power signals is provided at a substantially constant voltage.

12. The method of claim 10 wherein at least one of the first and second ac power signals has a controllable balance, and selecting the balance.

13. The method of claim 12 wherein at least one of the first and second ac power signals is provided at a substantially constant voltage.

14. A sub arc/tubular wire arc welding apparatus comprising:
a first source of wire disposed to provide wire to a first welding arc;
a second source of wire disposed to provide wire to a second welding arc, the second welding arc being disposed near the first welding arc;
a first source of ac power, disposed to provide a first switched ac power signal to the first arc;
a second source of ac power, disposed to provide a second ac switched power signal to the second arc;
a controller, connected to at least one of the first and second sources of power, whereby the controller controls the at least one of the first and second sources of power such that the first and second ac power signals are not in phase and not 120 degrees out of phase.

15. The apparatus of claim 14 wherein at least one of the first and second power sources is an adjustable balance power source.

16. The apparatus of claim 14 wherein at least one of the first and second power sources is an adjustable frequency power source.

17. A sub arc/tubular wire arc welding apparatus comprising:
a first source of wire disposed to provide wire to a first welding arc;
a constant voltage source, having a first substantially constant voltage, load independent, ac output power, made constant by controlling the voltage, disposed to provide a first ac power signal to the first arc;
a second source of wire disposed to provide wire to a second welding arc, the second welding arc being disposed near the first welding arc;
a second source of ac power, disposed to provide a second ac power signal to the second arc, such that the first and second ac power signals are not in phase.

18. The apparatus of claim 17 wherein at least one of the first and second power sources is an adjustable balance power source.

19. The apparatus of claim 17 wherein at least one of the first and second power sources is an adjustable frequency power source.

20. A sub arc/tubular wire arc welding apparatus comprising:
means for providing a first wire to a first welding arc;
means for providing a second wire to a second welding arc, the second welding arc being disposed near the first welding arc;
means providing a first switched ac power signal to the first arc;
means for providing a switched second ac power signal to the second arc; and
means for selecting a phase relationship between the first and second ac power signals from a plurality of at least three possible phase relationships.

21. The apparatus of claim 20 wherein the means for providing a first ac power signal includes a balance control means for controlling a balance of the first ac power signal.

22. The apparatus of claim 20 wherein the means for providing a first ac power signal includes a frequency control means for controlling the frequency of the first ac power signal.

23. A sub arc/tubular wire arc welding apparatus comprising:
means for providing a first wire to a first welding arc;
means for providing a first switched ac power signal to the first welding arc;
means for providing the first ac power signal at a substantially constant, load independent, voltage.

24. The apparatus of claim 23 wherein the means for providing a first ac power signal includes a balance control means for controlling a balance of the first ac power signal.

25. The apparatus of claim 23 wherein the means for providing a first ac power signal includes a frequency control means for controlling the frequency of the first ac power signal.

26. A sub arc/tubular wire arc welding apparatus comprising:
means for providing a first wire to a first welding arc;
means for providing a first switched ac power signal to the first welding arc;
means for providing a second wire to a second welding arc;
means for providing a second switched ac power signal to the second arc;
means for selecting a phase relationship between the first and second ac power signals from a plurality of at least three possible phase relationships;
means for selecting the frequency of the first ac signal.

27. The apparatus of claim 26 wherein the means for providing a first ac power signal includes means for providing a substantially constant voltage.

28. The apparatus of claim 26 wherein the means for providing a first ac power signal includes means for controlling a balance.

* * * * *